United States Patent [19]

Ueno et al.

[11] Patent Number: 4,487,880
[45] Date of Patent: Dec. 11, 1984

[54] METHOD FOR IMPARTING IMPROVED SURFACE PROPERTIES TO CARBON FIBERS AND COMPOSITE

[75] Inventors: Susumu Ueno; Hideaki Kamata, both of Ibaraki, Japan

[73] Assignee: Shin-Etsu Chemical Co., Ltd., Tokyo, Japan

[21] Appl. No.: 543,891

[22] Filed: Oct. 20, 1983

[30] Foreign Application Priority Data

Oct. 27, 1982 [JP] Japan ................................ 57-188526

[51] Int. Cl.³ ............................................. B05D 3/06
[52] U.S. Cl. .................................... 524/495; 427/39; 523/440
[58] Field of Search ....................... 524/495; 523/440; 427/39

Primary Examiner—Bernard D. Pianalto
Attorney, Agent, or Firm—Hopgood, Calimafde, Kalil, Blaustein & Judlowe

[57] ABSTRACT

The invention provides a means for solving the problem of poor affinity between the surface of carbon fibers and a synthetic resin in a resin-based composite material reinforced with the carbon fibers. The method comprises subjecting the surface of the carbon fibers in advance to exposure to low temperature plasma in a low pressure atmosphere of an inorganic gas generated by applying an electric voltage between electrodes. It was unexpectedly discovered that the discharge voltage between the electrodes is very critical and satisfactory results can be obtained when the peak-to-peak value of the discharge voltage between electrodes is 4000 volts or higher. The composition of the atmospheric inorganic gas is also important and the gas is preferably oxygen gas or a gaseous mixture containing at least 10% by volume of oxygen.

7 Claims, 1 Drawing Figure

FIGURE
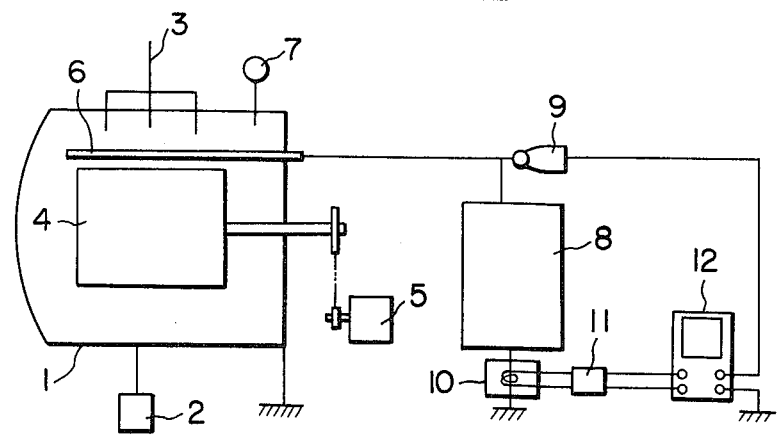

:::PAGE 1:::

4,487,880

METHOD FOR IMPARTING IMPROVED SURFACE PROPERTIES TO CARBON FIBERS AND COMPOSITE

BACKGROUND OF THE INVENTION

The present invention relates to a method for imparting improved surface properties to carbon fibers or, more particularly, to a method for imparting improved susceptibility to adhesive bonding with other materials such as synthetic resins to the surface of carbon fibers.

As is known, carbon fibers are widely used in various fields by virtue of their excellent mechanical strengths, high elastic modulus, heat resistance, corrosion resistance, electric conductivity, lightness and other properties as a material for construction of aircrafts and automobiles, electric and electronic parts, sporting goods and the like. For example, carbon fibers are characteristically useful as a reinforcing material in various kinds of so-called composite materials as combined with a synthetic resin as the matrix. One of the problems in such an application of carbon fibers is the poor adhesive bonding between the surface of the carbon fiber and the matrix resin depending on the types of the resin. A solution for such a problem has been obtained by the treatment of priming or pre-coating of the carbon fibers with another synthetic resin capable of being strongly bonded to both of the carbon fibers and the matrix resin although the results obtained by such a pretreatment is not always satisfactory so that it has long been desired to develop a novel and efficient method for imparting improved surface properties or, in particular, susceptibility to adhesive bonding to the surface of carbon fibers.

As is generally understood, the mechanical strengths, electric properties and other properties of composite materials composed of a synthetic resin as the matrix and a reinforcing material such as carbon fibers depend largely on the strength of adhesive bonding between the matrix resin and the surface of the reinforcing material so that the improvement of carbon fibers in connection with the susceptibility to adhesive bonding on the surface has been a matter of great concern in the fields of industries where the performance of reinforced composite materials is a key factor. Accordingly, the inventors have conducted extensive investigations to develop a novel and improved method therefor and arrived at a discovery leading to the completion of the present invention described below.

SUMMARY OF THE INVENTION

An object of the present invention is therefore to provide a novel and improved method for imparting improved surface properties or, in particular, improved susceptibility to adhesive bonding to the surface of carbon fibers.

The method of the present invention established as a result of the extensive investigations undertaken by the inventors with the above object comprises subjecting the surface of carbon fibers to exposure to the atmosphere of low temperature plasma of an inorganic gas, preferably oxygen or an oxygen-containing gas, of reduced pressure generated by the glow discharge with application of an electric voltage between the electrodes, the discharge voltage between the electrodes being at least 4000 volts.

When treated according to the method of the present invention, carbon fibers are imparted with greatly modified and improved surface properties in respect of the strength of adhesive bonding with synthetic resins so that the use of such treated carbon fibers in the form of filaments, yarns, mats, woven cloths and the like as a reinforcing material in a synthetic resin-based composite material has advantages that the mechanical and electrical properties of the composite material can be remarkably improved in comparison with conventional composite materials formed with untreated carbon fiber materials for reinforcement.

BRIEF DESCRIPTION OF THE DRAWING

The FIGURE is a schematic illustration of an apparatus used in the inventive method.

DETAILED DESCRIPTION OF THE PREFERRED EMBODIMENTS

The carbon fibers applicable to the treatment according to the invention are not particularly limitative in respect of the starting material from which the carbon fibers have been prepared including polyacrylonitrile-based and pitch- or bituminous material-based carbon fibers. As a matter of course, the form of the carbon fibers is under no limitation including single filaments, multi-filament yarns, chopped strands, mats, woven cloths or any other forms.

The inventive method for imparting carbon fibers with improved surface properties is performed by subjecting the surface of the carbon fibers to exposure to an atmosphere of low temperature plasma of an inorganic gas under reduced pressure generated in a space through which the inorganic gas is flowing. The inorganic gases suitable in the inventive method include helium, neon, argon, nitrogen, oxygen, air, nitrous oxide, nitrogen monoxide, carbon monoxide, carbon dioxide, bromine cyanide, sulfur dioxide, hydrogen sulfide and the like. These inorganic gases may be used either alone or as a mixture of two kinds or more according to need. It is preferable in the present invention that the inorganic gas constituting the plasma atmosphere is oxygen or a gaseous mixture containing at least 10% by volume of oxygen in view of the higher effectiveness of the plasma treatment. Organic gases may be contained in the plasma atmosphere although the concentration thereof should be limited.

The pressure of the inorganic gas in the plasma atmosphere should be in the range from 0.001 to 10 Torr or, preferably, from 0.01 to 1 Torr. When an electric power of 10 watts to 100 kilowatts at a high frequency of 10 kHz to 100 MHz is supplied to the electrodes installed in the space kept under the above mentioned reduced pressure, electric discharge readily takes place within the space to form an atmosphere of low temperature plasma. The frequency band of the electric power is not particularly limited to the above mentioned high frequency range but may be direct current or low frequency to microwave range although the high frequency range is preferred.

The arrangement of the discharge electrodes is not particularly limitative in the apparatus for the plasma treatment although it is preferable that the electrodes are installed inside the plasma chamber. The electrodes may be installed outside the plasma chamber or a single coiled electrode may be provided surrounding the plasma chamber. The electrodes are connected to the power source, e.g. high frequency generator, either by capacitance coupling or by inductance coupling and one or a set of the electrodes, when two or more of electrodes are provided for each polarity, should usually be grounded, the other electrode or the other set of electrodes being a power electrode or a set of power electrodes. The forms of the electrodes are also not particularly limitative including plate-like, ringwise, rod-like and cylindrical forms and the grounded and power electrodes may have the same form or different forms each from the other. A convenient disposition of the electrodes is that the walls of the plasma chamber are made of a metal to serve as the grounded electrode and a metal-made electrode of rod-like or other form held inside the plasma chamber serves as the power electrode.

The low temperature plasma to which the shaped article is exposed in the inventive method can be readily generated by the glow discharge within the space kept under a reduced pressure of an inorganic gas by applying a suitable discharge voltage between the discharge electrodes. It has been unexpectedly discovered that the value of this discharge voltage is very significant and should be at least 4000 volts so that the carbon fibers in the form of a single filament, multiple-filament yarn, chopped strand, mat or woven cloth having been exposed to the low temperature plasma can be imparted with remarkably improved susceptibility to adhesive bonding. The effectiveness of the plasma treatment is further increased when the discharge voltage is increased from 4,000 volts to 10,000 volts or higher correspondingly while the effectiveness may be insufficient, if not ineffective, with a discharge voltage lower than 4,000 volts unless the treatment is unduly prolonged to cause economical disadvantages. The discharge voltage has no particular upper limit although it should be taken into consideration that an excessively high discharge voltage necessarily is accompanied by the problems of heat evolution which may adversely effect the properties of the carbon fibers under treatment if not to mention the economical disadvantage due to the increased energy loss.

It should be noted that, in order to increase the discharge voltage to 4,000 volts or higher, the power electrode should be provided with an insulating coating with sufficient dielectric strength since application of a high voltage between the electrodes with the metal, e.g. copper, iron or aluminum, surfaces exposed bare may lead to the predominance of the dishcarge current limiting the discharge voltage to about 1,000 volts at the highest. In such a condition of the electrode insulation, the desired effect of the improvement in the adhesive bonding can of course be hardly expected for the carbon fibers.

The material for the insulating coating of the surface of the electrode made of a metal, e.g. copper, iron and aluminum, should preferably be a porcelain enamel, glass or ceramic from the standpoint of heat resistance and the dielectric strength thereof should preferably be 10,000 volts/mm or higher as measured with D.C. voltage application.

In addition to the above mentioned conditions of the discharge voltage of 4,000 volts or higher and the reduced pressure of the atmosphere in the range from 0.001 to 10 Torr, further desirable conditions are that the density of the power consumption should be at least 2.5 watts/cm$^2$ on the surface of the power electrode and the distance between the grounded and power electrodes should be in the range from 1 to 20 cm in order to obtain stable glow discharge for generating low temperature plasma within the space of the plasma chamber. When the pressure of the gaseous atmosphere exceeds 10 Torr, an unduly large electric power is necessitated to generate low temperature plasma with large heat evolution while the electric discharge may be unstable when the pressure of the gaseous atmosphere is smaller than 0.001 Torr. When the density of the power consumption is smaller than 2.5 watts/cm$^2$, the discharge voltage as high as desired can hardly be maintained so that the effect of improving adhesive bonding may be insufficient. When the distance between the grounded and power electrodes is smaller than 1 cm, the carbon fibers under treatment sometimes suffer the adverse effect of the heat evolved on the surface of the electrodes while an excessively large distance between the electrodes over 20 cm is undesirable due to the disadvantages caused by the large size of the apparatus as well as the increased power consumption with unduly large energy loss.

It should be noted that the effect of the treatment with low temperature plasma generated by the glow discharge is limited to the very surface of the shaped article as an inherent characteristic so that, despite the profound improvement or modification in the surface properties, the carbon fibers can retain advantageous properties of the bulk body inherent to them. For example, the carbon fibers are imparted with greatly improved susceptibility to adhesive bonding without decrease in the mechanical strengths so that a composite material made of the plasma-treated carbon fibers as the reinforcing material in the forms of single filaments, yarns, chopped strands and cloths may have remarkably improved mechanical and electrical properties by virtue of the improvement in the adhesive bonding between the matrix resin and the reinforcing material. In some cases, the shearing strength of the composite material manufactured of the plasma-treated reinforcing material may be increased by almost 200% over that of the similar composite material manufactured of the same reinforcing material but not treated by the low temperature plasma.

Following are the examples to illustrate the procedure and effectiveness of the inventive method in more detail but not to limit the scope of the invention in any way.

The apparatus used in the following examples is schematically illustrated in the accompanying FIGURE. The drum-wise plasma chamber 1 is made of a stainless steel and can be evacuated by means of the vacuum pump 2 connected thereto to a vacuum of 0.001 Torr or below the pressure. The plasma chamber 1 is also connected to a gas inlet 3 opening inside the chamber 1. It is optional according to need that the end of the gas inlet 3 is divided in manifold (in three branches in the FIGURE) with an object to ensure uniformity of the atmospheric conditions inside the plasma chamber 1. Inside the plasma chamber 1, a rotatable cylindrical electrode 4 made also of a stainless steel is provided as supported vacuum-tightly in a cantilever manner by a shaft penetrating the face plate of the plasma chamber 1 in such a manner that this cylindrical electrode can be rotated by means of the electric motor 5 approximately coaxially with the drum-wise plasma chamber 1 at a controllable velocity of rotation. This cylindrical electrode 4 is electrically grounded through the wall of the plasma chamber 1. In order to facilitate control of the temperature of the plasma treatment, a heating or cooling medium can be passed through inside of this rotatable cylindrical electrode 4. Further, a rod-like electrode 6, which serves as the power electrode, is provided inside the plasma chamber 1 in parallel with the axis of rotation of the cylindrical electrode 4 to form a gap of uniform width therebetween as electrically insulated from the plasma chamber 1 or the cylindrical electrode 4. The pressure inside the plasma chamber 1 is measured with a Pirani gauge 7 connected to the chamber 1.

The power electrode 6 is connected to the power output terminal of a high frequency generator 8, the other terminal thereof being grounded, to apply a high frequency voltage between the grounded electrode 4 and the power electrode 6. The discharge voltage between the grounded and power electrodes 4,6 can be determined by means of a high-voltage probe 9 connected to a two-channel synchroscope 12 which also serves to determine the discharge current between the electrodes 4,6 by means of a current probe 10 connected thereto through a termination 11.

In the above described metering assembly for high frequency power supply, the peak-to-peak value of the discharge voltage ($V_{p-p}$) is readily determined from the voltage shown by the amplitude of the image for the corresponding channel on the screen of the synchroscope 12 and multiplied by the reciprocal of the attenuation ratio in the high-voltage probe 9 while the discharge current is determined from the amplitude of the image for the second channel on the screen of the synchroscope 12 as multiplied by the sensitivity of the termination 11. The phase difference between the discharge voltage and the discharge current can be determined from the displacement between the wave forms for the voltage and current shown on the screen of the two-channel synchroscope 12.

Assuming an ideal sine wave for each of the discharge voltage and current, then the electric power of the discharge is given by the equation:

$$P = (E/2\sqrt{2}) \cdot (I/2\sqrt{2}) \cdot \cos\rho = (EI/8) \cdot \cos\rho,$$

in which P is the electric power of discharge in watts, E is the (peak-to-peak) discharge voltage in volts, I is the (peak-to-peak) discharge current in amperes and $\phi$ is the phase difference between the discharge voltage and current.

EXAMPLE 1

A multi-filament yarn with untreated surface formed of high-strength carbon fibers prepared by carbonizing polyacrylonitrile fibers and having a diameter of 7 μm, tensile strength of 280 kg/mm² and elastic modulus of 23,000 kg/mm² was wound around the rotatable cylindrical electrode 4 of the above described apparatus for the low temperature plasma treatment and the plasma chamber 1 was evacuated by means of the vacuum pump 2. When the pressure inside the chamber 1 had reached 0.001 Torr, continuous introduction of oxygen gas was started through the gas inlet 3 at a rate of 300N ml/minute so that the pressure inside the chamber 1 was kept constant at 0.1 Torr by the balance of the continuous evacuation and introduction of the oxygen gas.

When a high frequency voltage at a frequency of 200 kHz was applied between the grounded cylindrical electrode and the rod-like power electrode held apart to form a gap of a uniform width of 5 cm, low temperature plasma was generated in the space inside the plasma chamber 1. In applying the high frequency voltage, the value of the peak-to-peak discharge voltage in each of the runs was varied in the range from 2,000 to 10,000 volts as read on the synchroscope by controlling the power input in the range from 1.2 to 14.4 kilowatts as shown in Table 1 below. Since the electrode had an effective surface area for discharge of 500 cm², the density of the discharge power per unit area was in the range from 2.4 to 28.8 watts/cm² as shown in Table 2. With the above described conditions for the discharge, the duration of the plasma treatment was varied so that the integrated overall energy output per unit area of the discharge surface of the electrode was 40, 80, 160 or 320 watts·seconds/cm².

When the above described step of the low temperature plasma treatment came to the end, the carbon filament yarn was unwound and rewound on the cylindrical electrode to expose the reverse side and the procedure of the low temperature plasma treatment of the second side of the yarn was repeated in just the same manner as described above for the first side.

The carbon filament yarns thus twice treated on both sides with low temperature plasma were then woven into a plain-woven cloth, which was processed into a carbon fiber-reinforced composite sheet with an epoxy resin (American Cyanamid BP-907) as the matrix by the techniques of hand lay-up molding followed by curing the epoxy resin at room temperature. The content of the carbon fibers in this composite sheet was 60% by volume.

The above prepared carbon fiber-reinforced composite sheet was subjected to the measurement of the tensile strength according to the procedure specified in JIS K 7113 to give the results shown in Table 1 to follow. Meanwhile, the tensile strength of the composite sheet prepared in the same manner as above but by use of the carbon fiber yarns before low temperature plasma treatment was 55 kg/mm².

TABLE 1

| Peak-to-peak voltage, volts | Power, kW | Power density, W/cm² | Integrated energy output, W · sec/cm² | | | |
|---|---|---|---|---|---|---|
| | | | 40 | 80 | 160 | 320 |
| 2000 | 1.2 | 2.4 | 55 | 60 | 65 | 70 |
| 3000 | 2.0 | 4.0 | 65 | 70 | 75 | 80 |
| 4000 | 2.9 | 5.8 | 95 | 110 | 120 | 130 |
| 5000 | 3.9 | 7.8 | 100 | 120 | 130 | 140 |
| 7000 | 6.6 | 13.2 | 120 | 135 | 150 | 155 |
| 10000 | 14.4 | 28.8 | 130 | 140 | 160 | 165 |

(tensile strength in kg/cm²)

As is clear from the results shown in Table 1, the tensile strength of the composite material prepared of the plasma-treated carbon fibers as the reinforcing material is greatly superior to that of the similar composite sheet prepared of the untreated carbon fibers, presumably, due to the improvement in the adhesive bonding between the carbon fibers and the matrix resin. In particular, the effect of plasma treatment is less remarkable when the peak-to-peak value of the discharge voltage is 3,000 volts or below than with a discharge voltage of 4,000 volts or higher even when the length of the treatment time is controlled to give the same overall discharge power consumption. In other words, the efficiency of the plasma treatment can be greatly improved by increasing the peak-to-peak value of the discharge voltage to 4,000 volts or higher.

EXAMPLE 2

High-strength carbon fibers having a diameter of 7 μm, tensile strength of 280 kg/mm² and elastic modulus of 23,000 kg/mm² prepared by carbonizing polyacrylonitrile fibers without surface treatment were wound around the cylindrical electrode of the same plasma treatment apparatus as used in the preceding example and the plasma chamber was evacuated. When the pressure inside the chamber had reached 0.001 Torr, continuous introduction of argon gas and oxygen gas was started each at a rate of 300N ml/minute so that the pressure inside the chamber was kept constant at 0.4 Torr.

A high frequency electric power at a frequency of 13.56 MHz was applied between the cylindrical grounded electrode and power electrode held to form a uniform gap of 3 cm width so as to generate low temperature plasma inside the chamber. The peak-to-peak value of the dischargre voltage between the electrodes was varied in the range from 2,000 to 10,000 volts by controlling the power output of the high frequency generator. The power input in this case was in the range from 1.0 to 11.6 kilowatts corresponding to the power density on the electrode surface of 2.0 to 23.2 watts/cm² with the surface area of the electrode being equal to 500 cm². The length of the treatment time was varied to give the same overall power consumption per unit area of 160 watts·seconds/cm² throughout the runs.

When the above described step of the low temerature plasma treatment came to the end, the carbon filament yarn was unwound and rewound on the cylindrical electrode to expose the reverse side and the procedure of the low temperature plasma treatment of the second side of the yarn was repeated in just the same manner as described above for the first side.

The carbon filament yarn thus twice treated on both sides with the low temperature plasma was chopped in 3 to 6 mm length and the chopped yarns were blended with a nylon 66 resin in an extruder machine and extruded therefrom to be pelletized. The content of the carbon fibers in the pellets was 30% by weight. The pellets were molded by a conventional technique of injection molding into a rod-like body of which the tensile strength was measured according to the procedure specified in JIS K 7113 to give the results shown in Table 2 below together with the peak-to-peak values of the discharge voltage between the electrodes, the input powers and the densities of the discharge power per unit area of the electrode. Meanwhile, the tensile strength of the rod-like body prepared in the same manner but by use of the untreated carbon filament yarn was 2,100 kg/cm².

As is clear from the results shown in Table 2, the composite body of the nylon 66 resin reinforced with the plasma-treated carbon fibers had a much larger tensile strength than that of the rod prepared by use of the untreated carbon fibers and the effect is much more remarkable when the peak-to-peak value of the discharge voltage is 4,000 volts or higher.

TABLE 2

| Peak-to-peak voltage, volts | Power, kW | Power density, W/cm² | Tensile strength, kg/cm² |
| --- | --- | --- | --- |
| 2000 | 1.0 | 2.0 | 2300 |
| 3000 | 1.5 | 3.0 | 2500 |
| 4000 | 2.3 | 4.6 | 4000 |
| 5000 | 3.1 | 6.2 | 4500 |
| 7000 | 5.3 | 10.6 | 4700 |
| 10000 | 11.6 | 23.2 | 4800 |

EXAMPLE 3

The same multi-filament yarn of carbon fibers without surface treatment as used in Example 1 was woven into a plain-woven cloth which was wound around the cylindrical grounded electrode of the same plasma treatment apparatus and the plasma chamber was evacuated. When the pressure inside the chamber had reached 0.001 Torr, continuous introduction of either pure nitrogen gas or oxygen gas alone or a gaseous mixture of nitrogen and oxygen into the chamber was started each at a rate of 100N ml/minute so that the pressure inside the chamber was kept constant at 0.1 Torr. The mixing ratio of the nitrogen and oxygen in the gaseous mixture was varied as shown in Table 3 below.

A high frequency electric power at a frequency of 110 kHz was applied between the grounded and power electrodes held to form a uniform gap of 4 cm width for a length of 40 seconds to give a peak-to-peak discharge voltage of 7,000 volts in each of the runs.

The thus plasma-treated cloth was unwound and rewound around the cylindrical electrode to expose the reverse side and the second plasma treatment was conducted in just the same manner as above. The carbon yarn cloth thus twice treated on both sides with the low temperature plasma was processed into an epoxy resin-based composite sheet in the same manner as in Example 1 and the tensile strength of the composite sheet was measured according to the procedure specified in JIS K 7113 to give the results shown in Table 3. The content of the carbon fibers in the composite sheet was 60% by volume. Meanwhile, the tensile strength of the composite sheet prepared of the carbon yarn cloth before the low temperature plasma treatment was 50 kg/mm².

As is clear from the results shown in Table 3, it is apparent that the low temperature plasma treatment of the carbon fibers is very effective in increasing the tensile strength of the composite resin sheet prepared by use of the woven cloth of the carbon filament yarn as the reinforcing material and the effect is remarkable only when the content of oxygen in the atmospheric gas is 10% by volume or larger.

TABLE 3

| Volume ratio in gaseous mixture, oxygen/nitrogen | Tensile strength, kg/cm² |
| --- | --- |
| 0/100 | 55 |
| 5/95 | 57 |
| 10/90 | 120 |
| 20/80 | 125 |
| 40/60 | 130 |
| 60/40 | 140 |
| 80/20 | 155 |
| 90/10 | 155 |
| 100/0 | 155 |

What is claimed is:

1. A method for imparting improved surface properties to a carbon fiber which comprises subjecting the surface of the carbon fiber to exposure to the atmosphere of low temperature plasma of an inorganic gas under a reduced pressure generated by glow discharge with application of an electric voltage between a grounded electrode and a power electrode, the discharge voltage between the electrodes being at least 4000 volts.

2. The method as claimed in claim 1 wherein the inorganic gas is oxygen or a gaseous mixture containing at least 10% by volume of oxygen.

3. The method as claimed in claim 1 wherein the reduced pressure is in the range from 0.001 to 10 Torr.

4. The method as claimed in claim 1 wherein the surface of the electrode is coated with a heat-resistant, electrically insulating material.

5. The method as claimed in claim 1 wherein the grounded electrode and the power electrode are apart from each other at a distance from 1 to 20 cm.

6. The method as claimed in claim 1 wherein the density of the electric power on the surface of the power electrode is at least 2.5 watts/cm$^2$.

7. An improvement in a synthetic resin-based composite material reinforced with carbon fibers embedded in the matrix of the synthetic resin which comprises subjecting the surface of the carbon fiber before incorporation into the synthetic resin to exposure to the atmosphere of low temperature plasma of an inorganic gas under a reduced pressure generated by glow discharge with application of an electric voltage between a grounded electrode and a power electrode, the discharge voltage between the electrodes being at least 4000 volts.

* * * * *